Aug. 4, 1959  F. K. GLASBRENNER ET AL  2,897,672
FLOW METER
Filed Oct. 27, 1955

INVENTORS.
FREDERICK K. GLASBRENNER
WILLIAM E. LYONS
BY
Edward M. Tittle
THEIR ATTORNEY—

2,897,672
FLOW METER

Frederick Kemp Glasbrenner, North Syracuse, and William Emmanuel Lyons, Rexford, N.Y., assignors to General Electric Company, a corporation of New York Application October 27, 1955, Serial No. 543,128

5 Claims. (Cl. 73—228)

The present invention relates to a fluid flow meter and more particularly to a flow meter which has a very low time constant and low pressure drop and which is capable of accurate measurement over wide flow ranges yet is of simple and inexpensive construction.

The present invention provides a simple but reliable flow meter capable of, but not limited to, metering jet engine fuel oils; with a range of flow of 10 to 1 for any one unit; at a time constant of 10 milliseconds or less; over a range of operating temperatures from 60 to 250° F.; with a range of operating pressures from zero to 2,000 p.s.i.; with a pressure drop of less than ten pounds at 40,000 p.p.h. flow; and an accuracy of plus or minus one percent of the actual flow. These results are obtained in the present invention by provision of means for changing the direction of flow of a stream of fluid, means for measuring the reactive force caused by the change in direction of flow and means for computing mass rate of flow of the stream of fluid as a function of the reactive force.

An object of the present invention is the provision of a flow meter which measures mass rate of flow of a moving fluid as a function of the reactive force caused by a change in its direction.

Another object is the provision of a flow meter having no moving parts and which is accurate within one percent of the actual flow.

Figure 1:
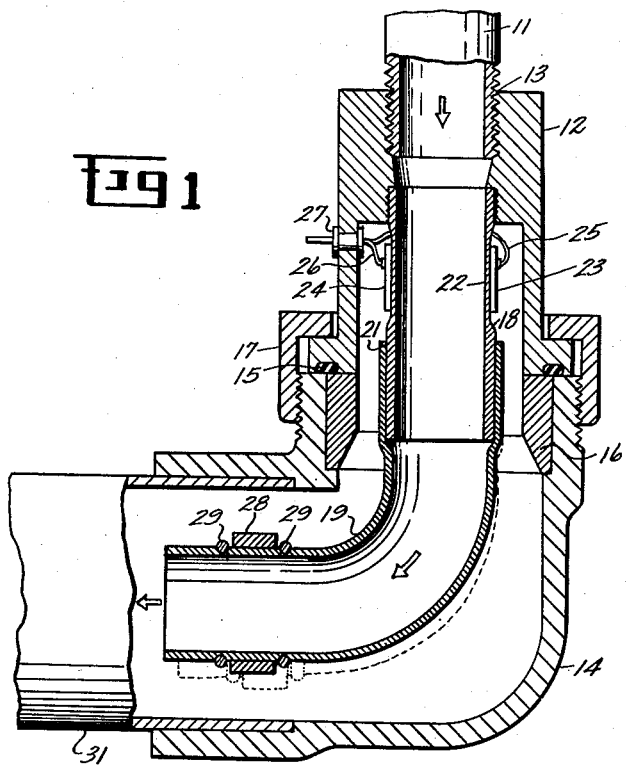
Figure 2:
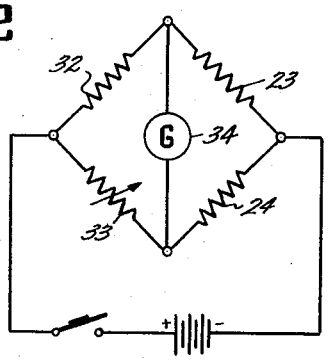

Other objects and many of the attendant advantages of this invention will be readily appreciated as the same becomes better understood by reference to the following detailed description when considered in connection with the accompanying drawings wherein:

Fig. 1 is an elevation view partly in section of a flow meter according to the present invention; and Fig. 2 is a circuit diagram of the Wheatstone bridge circuit used in the present invention.

Referring more particularly to Fig. 1 of the drawing, a fluid inlet pipe 11 is threadedly connected to a cap member 12 as at 13. The cap member 12 bears against an elbow chamber 14 and forms a closure for one end of the chamber. An O-ring 15 is positioned between the cap member and the elbow chamber and internal washer 16, sealing the connection between the cap member and the chamber. An external collar 17 is threaded to the elbow chamber 14 and retains the cap member 12 in position. A straight section of tubing 18 is threadedly connected at its upstream end to the interior of the cap member opposite the inlet pipe 11. The end of the tube 18 removed from the cap member is connected to an elbow tube 19 as at 21 by any suitable means such as press fitting, threading or welding. The tube 18 is provided with a reduced section 22 capable of bending over a portion of its length between the point of attachment to the cap member and to the elbow tube. Electrical resistance strain gages 23 and 24 are bonded to opposite surfaces of the reduced section 22 and are energized through the lead wires 25 and 26 which pass through insulated terminals 27 in the cap member. An annular weight 28 is positioned on the elbow tube near its unsupported downstream end and is loosely retained thereon in any suitable manner, such as the split rings 29 recessed within grooves in the wall of the elbow tube. A transition section 31 is attached to the elbow chamber as shown and at its opposite end is connected to the fluid discharge pipe.

As shown in Fig. 2 the resistance strain gages 23 and 24 are connected with resistances 32 and 33 into a Wheatstone bridge circuit such that any unbalance in the circuit can be noted on a galvanometer 34.

In the operation of the present invention moving fluid from the inlet pipe 11 is directed into the straight tube 18, then through the elbow tube 19 into the transition tube 31 and from there into the discharge pipe (not shown). Since the moving fluid is under pressure it backs up in the transition tube and circulates within the elbow chamber around the outside of the straight tube and elbow tube. The moving fluid passing through tube 18 causes a stress on the tube at the reduced section 22 due to the change in direction of the fluid as it passes through the elbow tube 19. When the tube is stressed by the reactive force of the fluid, strain gage 23 is caused to compress and decrease in resistance, at the same time strain gage 24 is in tension and increases in resistance. This unbalanced electrical condition in the circuit is indicated by the galvanometer of the bridge. The readings of the galvanometer are indications of the reactive force of the fluid flowing through the flow meter. To derive a signal from the present flow meter which is proportional to mass flow, the output signal of the meter is multiplied by a signal proportional to the density of the fluid and the square root taken of this product. In practice, the dial of the galvanometer 34 should be calibrated to read fluid flow, density 1.0. The reading of the dial is then multiplied by the actual density of the fluid and the square root taken of the product to determine the actual mass rate of flow. The sensing element, consisting of the straight tube 18 and the elbow tube 19, like almost everything else, has a natural frequency at which it will resonate. Any pump used in the fluid supply line will transmit a pulse which, if the pump is turning at the correct number of r.p.m., may cause the sensing element to resonate, thus causing the sensing element to fatigue and change its characteristics. To minimize the effect of resonance the annular weight 28 is installed on the unsupported end of the elbow tube. The loose fitting weight exerts a damping action which is a combination of friction dampening and viscous dampening and reduces the effects of resonance to a point where it causes no trouble.

The chamber 14 and the tube 19 are illustrated as being elbow shaped, but it is understood that other shapes, such as a U, may be utilized if desired.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A fluid flow meter comprising: a fluid chamber adapted to be connected in a fluid supply line; a tubular sensing element for changing the direction of flow of the fluid, said element being mounted at its upstream end in said chamber, the downstream end of said sensing element being angularly related to the upstream end and being unsupported; dampening means mounted on said sensing element; and means in contact with the area of greatest stress of said sensing element for sensing the reactive force caused by the change in direction of the fluid.

2. A fluid flow meter as defined in claim 1 wherein said damping means includes an annular weight loosely mounted adjacent the downstream end of the sensing element.

3. A fluid flow meter comprising: an elbow chamber adapted to be connected in a fluid supply line; a tube including an elbow for changing the direction of flow of the fluid, said tube having a reduced wall section adjacent its upstream end, the upstream end of the tube being connected to said chamber and the downstream end of the tube being unsupported within the chamber; and strain gages bonded to the reduced wall section of said tube for sensing the reactive force caused by the change in direction of flow of the fluid.

4. A fluid flow meter as defined in claim 3 including an annular weight loosely mounted on the tube adjacent the downstream end for damping vibrations thereof.

5. A fluid flow meter comprising: stationary wall means defining a fluid chamber including an inlet and outlet adapted to be connected in a fluid flow line; a tubular sensing element including an elbow section intermediate the ends thereof, said tubular element having an upstream end fixedly mounted in said chamber and open to said chamber inlet and having a downstream end unsupported in said chamber and open to said chamber outlet so as to pass fluid therethrough between the chamber inlet and outlet, said tubular element being flexible over at least a portion of its length so as to bend when stressed by reactive force due to the changing direction of flow of the fluid passing through the elbow section thereof; and strain sensing means in contact with an area of stress of said tubular element for sensing bend therein due to such reactive force.

References Cited in the file of this patent

UNITED STATES PATENTS

| | | |
|---|---|---|
| 2,538,785 | Karig | Jan. 23, 1951 |
| 2,592,569 | Henderson | Apr. 15, 1952 |
| 2,683,369 | Brewer | July 13, 1954 |
| 2,804,771 | Brown | Sept. 3, 1957 |

FOREIGN PATENTS

| | | |
|---|---|---|
| 734,992 | Great Britain | Aug. 10, 1955 |